（12）United States Patent
Cannon et al.

(10) Patent No.: US 7,348,805 B2
(45) Date of Patent: Mar. 25, 2008

(54) CHIP-TO-CHIP DIGITAL TRANSMISSION CIRCUIT DELIVERING POWER OVER SIGNAL LINES

(75) Inventors: Todd A. Cannon, Mantorville, MN (US); William J. Csongradi, Jr., Rochester, MN (US); Roger J. Gravrok, Eau Claire, WI (US); David L. Pease, Rochester, MN (US); Ryan J. Schlichting, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 11/381,135

(22) Filed: May 2, 2006

(65) Prior Publication Data

US 2007/0257823 A1    Nov. 8, 2007

(51) Int. Cl.
*H03K 19/0175* (2006.01)
(52) U.S. Cl. ............................ 326/86; 326/30; 327/108
(58) Field of Classification Search ................ 326/112, 326/115, 121, 127, 82, 83, 86, 26, 30; 327/108, 327/109
See application file for complete search history.

(56) References Cited

U.S. PATENT DOCUMENTS

| | | | |
|---|---|---|---|
| 5,065,133 A | 11/1991 | Howard | |
| 5,666,354 A | 9/1997 | Cecchi et al. | |
| 5,977,796 A * | 11/1999 | Gabara | 326/86 |
| 6,304,106 B1 | 10/2001 | Cecchi et al. | |
| 6,448,815 B1 * | 9/2002 | Talbot et al. | 326/86 |
| 6,549,754 B1 | 4/2003 | Miller et al. | |
| 6,580,901 B1 | 6/2003 | Mochizuki | |
| 6,737,887 B2 | 5/2004 | Forbes et al. | |
| 6,927,608 B1 * | 8/2005 | Chen et al. | 327/108 |
| 6,944,239 B2 | 9/2005 | Cecchi et al. | |
| 7,061,279 B1 * | 6/2006 | Leete | 327/65 |
| 7,102,390 B2 * | 9/2006 | Frans et al. | 326/82 |
| 2003/0122593 A1 * | 7/2003 | Volk | 327/108 |
| 2006/0132179 A1 * | 6/2006 | Kim | 326/82 |

* cited by examiner

*Primary Examiner*—Vibol Tan
*Assistant Examiner*—Christopher Lo
(74) *Attorney, Agent, or Firm*—Cantor Colburn LLP

(57) ABSTRACT

A chip-to-chip digital transmission circuit includes a differential driver portion, a pair of differential signal transmission lines connected to the driver portion, and a receiver portion connected to the transmission lines, an output node of which reproduces a digital bit stream originally presented to a driver side input node, wherein the transmission lines carry both transmitted signal information and DC power for the receiver portion. The driver portion is configured to adjust both the transmitted signal magnitude and the DC power delivered to the receiver portion.

14 Claims, 2 Drawing Sheets

CHIP-TO-CHIP DIGITAL TRANSMISSION CIRCUIT DELIVERING POWER OVER SIGNAL LINES

BACKGROUND

The present invention relates generally to transistor receiver circuits and, more particularly, to a chip-to-chip digital transmission circuit for delivering power over signal lines.

Differential signaling is often used in signal transmission where undesirable electrical noise may be induced on the transmission line. Such electrical noise in single-wire signaling can cause the signal voltage to rise above or fall below its acceptable threshold voltage, resulting in faulty switching at the receiving end. Differential signaling, on the other hand, simultaneously transmits two signals that are complements of each other. The logic state of a particular bit of information transmitted by a differential signal can be determined by taking the difference of the two signals' voltage levels. Since these two signals are transmitted on physically adjacent transmission lines, electrical noise induced on one line is also induced on the other. Undesirable noise therefore may affect the two signals, but the difference between the two remains substantially the same. The advantages of differential signaling are well known for conventional differential links.

A bi-directional link can be used in any situation where two devices must communicate with each other. A first communicating device can send data to a second communicating device, while the second communicating device can be sending data to the first communicating device. Alternatively, after the first device has completed one burst of data, the second communicating device can send data to the first communicating device. The advantages of bi-directional links over conventional methods include a reduction in the wiring between communicating devices and a reduction in the number of connector pins on each communicating device.

Over the last several years, CMOS-based (complementary metal-oxide semiconductor) integrated circuit (IC) technologies have been designed to operate with progressively lower power supply voltages with each passing generation. Lower supply voltages dictate lower voltage swings for the associated digital signals, which typically switch between ground and the power supply voltage. The benefits of using lower supply voltages include lower power consumption and faster signal switching times. However, Depending on the location of a communication path between chips, the attenuation of the path may be such that a certain level of power must be provided at the receiving end of the communication circuit. High-loss paths may require more power to be spent by the driver and receive circuits than is needed for some low-loss paths.

It would be desirable, therefore, to be able to provide a digital, chip-to-chip transmission circuit that can customize the level of power used for a specific communication path, and that can invest the circuit power only where it is needed.

SUMMARY

The foregoing discussed drawbacks and deficiencies of the prior art are overcome or alleviated by a chip-to-chip digital transmission circuit. In an exemplary embodiment, the transmission circuit includes a differential driver portion, a pair of differential signal transmission lines connected to the driver portion, and a receiver portion connected to the transmission lines, an output node of which substantially reproduces a digital bit stream originally presented to a driver side input node, wherein the transmission lines carry both transmitted signal information and DC power for the receiver portion.

In another embodiment, a bi-directional, chip-to-chip digital transmission circuit includes a first differential driver portion of a first chip domain, and a pair of differential signal transmission lines connected to the first differential driver portion, the differential signal transmission lines coupling the first chip domain to a second chip domain. A first receiver portion of the second chip domain is connected to the transmission lines, and a second differential driver portion of the second chip domain is connected to the transmission lines. A second receiver portion of the first chip domain is connected to the transmission lines, wherein the transmission lines are configured to carry, in both directions, transmitted signal information from one of the chip domains and DC power for the receiver portion of the other of the chip domains.

BRIEF DESCRIPTION OF THE DRAWINGS

Referring to the exemplary drawings wherein like elements are numbered alike in the several Figures.

DETAILED DESCRIPTION

Disclosed herein is a chip-to-chip transmission circuit that is configured to send receiver power over the signal lines. This configuration both simplifies system design and enables optimization of both drive-strength tuning and receiver-power delivery to compensate for specific path attenuation. As also disclosed herein, the power level of the receiver circuitry is adjustably controlled through the drive circuitry, as is the degree of signal swing of the differential data signal.

Figure 1:
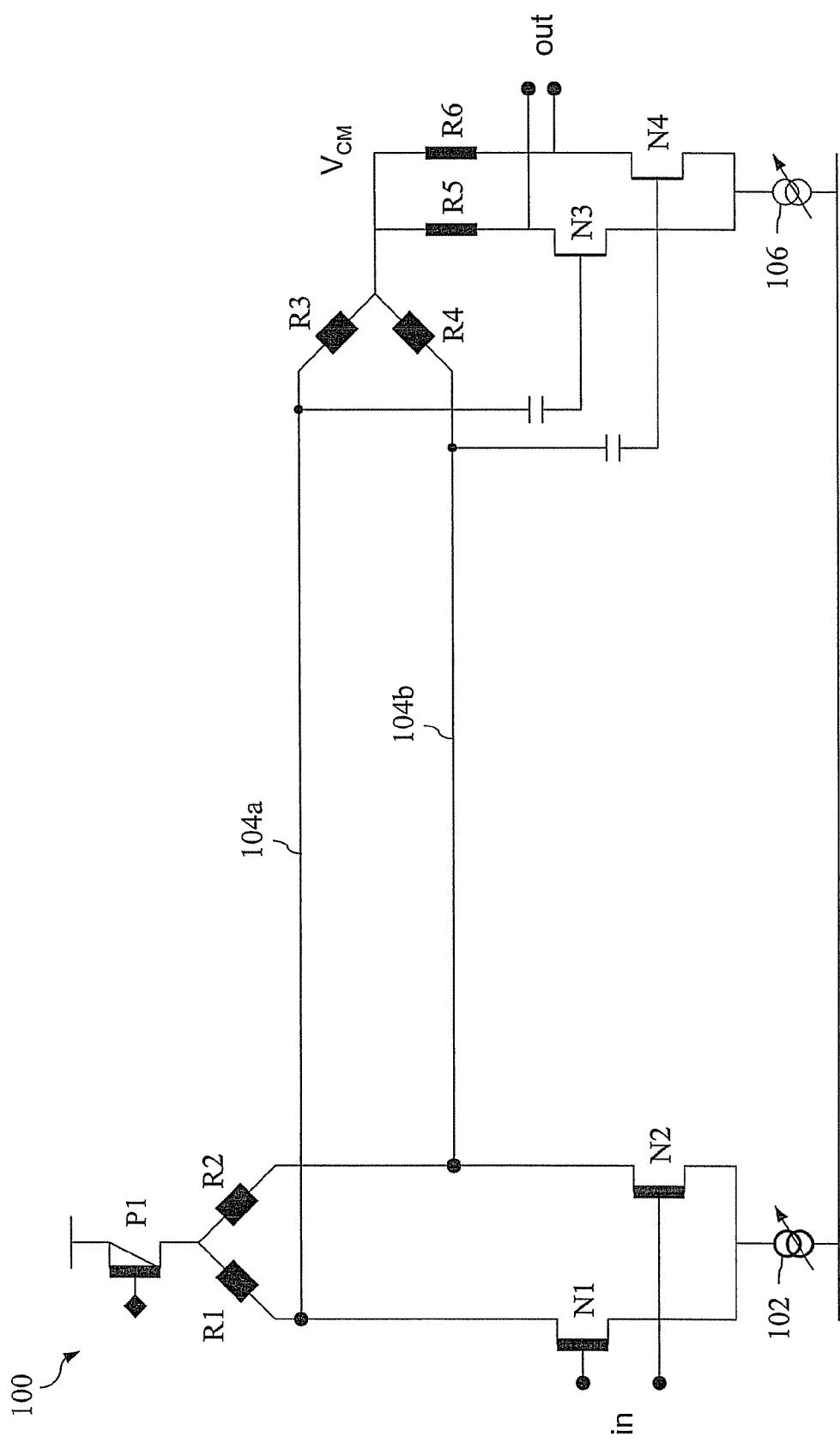
FIG. 1 is a schematic diagram of a chip-to-chip digital transmission circuit for delivering power over signal lines, in accordance with an embodiment of the invention.

Referring initially to FIG. 1, there is shown a schematic diagram of a chip-to-chip digital transmission circuit 100 for delivering power over signal lines, in accordance with an embodiment of the invention. A driver portion of the circuit 100 includes a pair of NFETs N1 and N2, driver load resistors R1 and R2, PFET P1, and an adjustable current source 102. The driver portion of the circuit 100 receives a complementary digital signal pair at the gates of N1 and N2, wherein the complementary digital signal is transmitted over a pair of (differential) signal lines 104a, 104b.

Unlike a conventional low voltage differential signal (LVDS) driver, PFET P1 (depending on the conductivity thereof) provides an adjustable common mode voltage, which is used to supply power for the receiver portion of the circuitry 100. In addition, the adjustable current source 102 further provides the capability of adjusting the magnitude of the differential signal swing. By way of example, if the gate voltage of PFET P1 is selected to hold the common node between R1 and R2 at 1.0 volts, the adjustable current source 102 is set to provide 10 mA of current, and the value of resistors of R1 and R2 are selected to be 50Ω, then the voltage drop across the conducting leg of the driver portion is 0.5 volts. In this example, then, the differential voltage swing transmitted over lines 104a, 104b is 0.5 volts with a common mode voltage ($V_{CM}$) of 0.75 volts.

Where it is desired to decrease the differential swing of the driver portion, the current source 102 is adjusted to decrease the amount of current provided in the driver. In the present example, then, by reducing the amount of current provided by current source 102 to 5 mA, then the voltage drop across the conducting leg is reduced to 0.25 volts.

Referring still to FIG. 1, the receiver portion of circuit 100 includes a pair of NFETs N3 and N4, impedance matching load resistors R3 and R4, common mode voltage load resistors R5, R6, and adjustable current source 106. As indicated above, DC power for the receiver portion of the circuit 100 is sent over the differential signal lines 104a, 104b, and taken from the common mode voltage node $V_{CM}$. The differential AC signal information transmitted across the interconnect path is capacitively coupled (in the exemplary embodiment) to the gates of the receiver NFETs N3, N4. Since the receiver portion of circuit 100 receives its DC power from the driver portion, the receiving NFETs N3, N4 need no local input-power domain from the receiver chip. This feature provides considerable design flexibility with respect to conventional input/output (I/O) circuit designs that necessitate a complex interrelation between the I/O power domains of the driving and receiving chips. The decoupling of the driver and receiver supply voltages enables a future-proof circuit design at the system level, which was one of the attractions of open-drain circuits of the past.

Because the level of the common mode voltage is locally (and independently) controlled through the driver side current source 102 and PFET P1, it can therefore be dynamically configured by the driver side control circuitry. This enables both the signal-swing and the DC power sent down the interconnect path to be dynamically tuned to compensate for the path attenuation. The dynamic tuning may be implemented during link initialization and periodically during the life of the link. In contrast, most I/O circuit art uses fixed drive levels and hardwired power connections. This dynamic tuning capability also enables the same chip circuitry to be instantiated in high-loss and low-loss circuit paths with no change to the hardware, but only to the control settings.

It will be further noted that the relative strength of N3 and N4 is less than N1 and N2, due to N3 and N4 being supplied by the common mode voltage generated at the driver portion of the circuit 100, as well as the capacitive coupling of N3 and N4 to the transmission lines 104a, 104b. Correspondingly, current source 106 supplies less current in the receiver portion than current source 102 supplies in the driver portion of the transmission circuit 100. In FIG. 1, this is schematically depicted by using heavier shading for stronger devices.

Furthermore, by matching the termination loads R3, R4 to the driver loads R1, R2, the circuit 100 has inherent symmetry that can enable bi-directional operation. Although the common node at each end of the circuit 100 is "static" in that one side drives while the other receives, the end-to-end symmetry is suitable for drive and receive electronics instantiated on both ends of the transmission line. While certain bi-directional transmission paths require both separate circuits and paths, those bi-directional circuits that do happen to share the same differential transmission lines still do not enjoy the symmetric simplicity of the two "static" endpoint nodes nor do they generate and deliver the DC power for both the transmitting and receiving devices.

Figure 2:
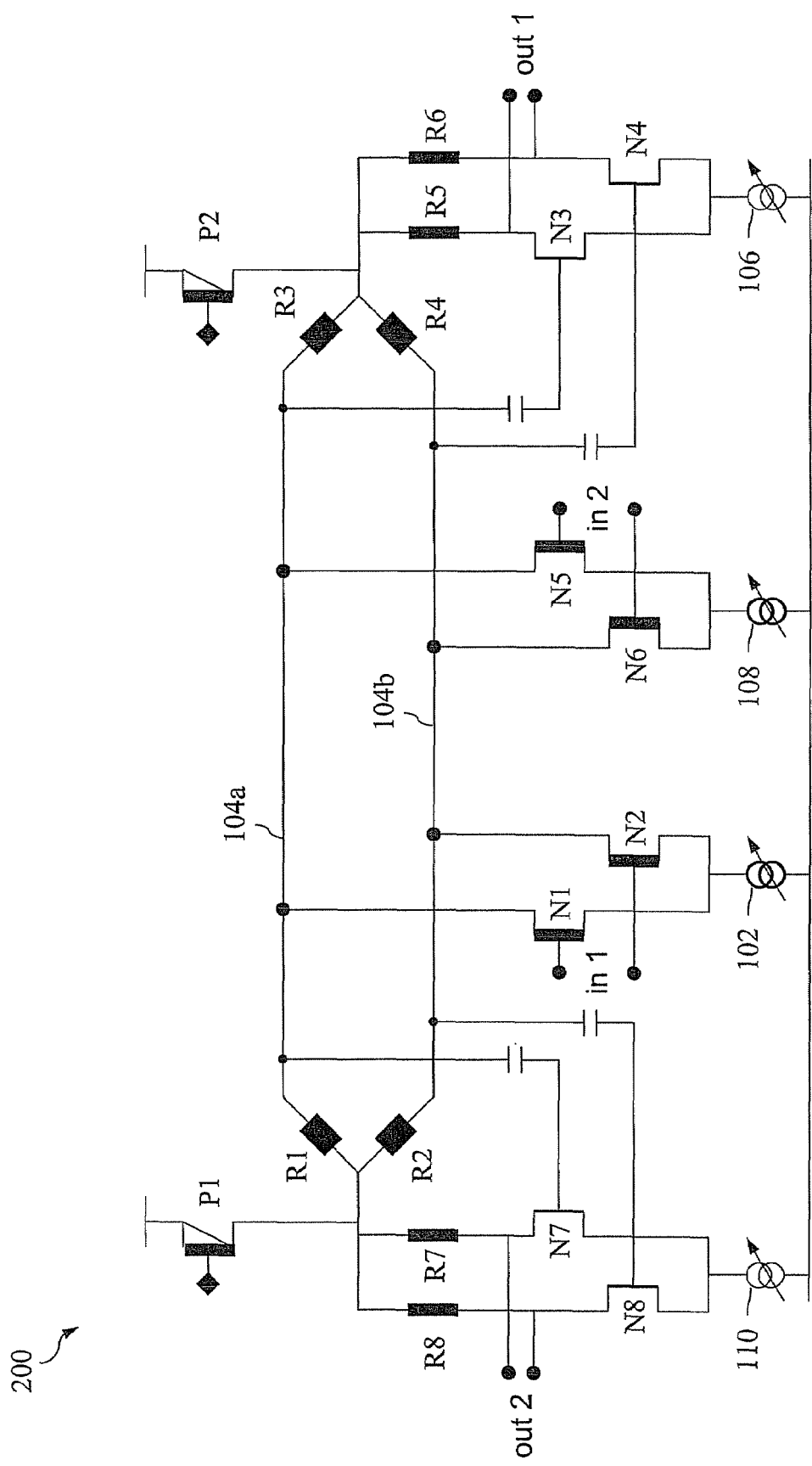
FIG. 2 is a schematic diagram of a bi-directional chip-to-chip digital transmission circuit for delivering power over signal lines, in accordance with a further embodiment of the invention.

Accordingly, FIG. 2 is a schematic diagram of a bi-directional chip-to-chip digital transmission circuit 200 for delivering power over signal lines, in accordance with a further embodiment of the invention. As can be seen, both chip domains on opposing ends of the transmission line pair 104a, 104b, include transmit (driver) and receiver devices. Moreover, each domain provides the pull up PFETs P1, P2 that set the common mode voltage level used on the receive end, as well as the adjustable current sources for controlling the swing level. For ease of illustration, like components are designated with the same reference numerals in FIG. 2. Thus, in addition to the components shown in FIG. 1, the transmission circuit of Figure further includes PFET P2, transmission NFETs N5 and N6, receive load resistors R7 and R8, receiver NFETs N7 and N8, and adjustable current sources 108, 110.

When transmitting a digital data stream from the chip domain on the right side of FIG. 2 to the left side, therefore, the gate voltage of P2 and the current supplied by source 108 determines the common mode voltage for receive devices N7 and N8.

As will be appreciated from the above described embodiments, the use of the common mode voltage of a differential signal pair to power receive components reduces the need to deliver power through a plurality of solid copper layers on a printed circuit board. This also reduces the need to carve up certain signal or power layers to get miscellaneous type voltages to remote areas of circuit cards, and thus reduces the total number of layers in a printed circuit board.

During a channel training/initialization type function, the driver/receiver power may be tuned to an appropriate level for a particular path. This would, in essence, create a custom tuned power level for that specific circuit path. As such, an entire interface, on a per path basis, could be optimized so as to use a minimal level of power to successfully communicate data. Where needed, more power may be applied to compensate for greater signal losses in a particular transmission path(s) to achieve reliable transmission, such that a low total power consumption is achieved for short (i.e., low loss) paths, and higher power is invested to achieve reliable transmission over longer (or noisier) paths.

Similarly, these power-tunable drive and receive circuits may be dynamically adjusted to deliver performance and or speed requirements as the system requires. Where reliable transmission is the priority, more power may be invested. Conversely, if power consumption is more important than reliability or performance, then power may be dynamically scaled back to an acceptable lower level of reliability or performance. Likewise, if the transmission path is temporarily under utilized, then the circuit power can be throttled down to a low performance sleeper mode to save power—such as in a laptop. Because the receiver gets its power from the driver, the core electronics within the rest of the receiver chip can voltage scale independently of the driver chip electronics. This in turn enables design flexibility and unconstrained technology migration; i.e., "future-proofing."

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A chip-to-chip digital transmission circuit, comprising:
a differential driver portion, comprising a pull up device configured between a voltage supply rail and a pair of driver side load resistors, said driver side load resistors connected to opposing legs of the differential driver portion, a pair of driver pull down devices connected to the opposing legs of the differential driver portion, wherein gate terminals of the pair of driver pull down devices comprise the driver side input node, and a first adjustable current source configured to provide current through a conducting one of the opposing legs of the driver portion;
a pair of differential signal transmission lines connected to the driver portion;
a receiver portion connected to the transmission lines, an output node of which substantially reproduces a digital bit stream originally presented to a driver side input node, wherein the receiver portion further comprises a pair of impedance matching load resistors connected at first ends thereof to a corresponding one of the differential signal transmission lines, said pair of impedance matching load resistors connected to one another at second ends thereof so as to define a common mode voltage node, a pair of common mode voltage load resistors coupled at first ends thereof to the common mode voltage node, and at second ends thereof, to a pair of receiver pull down devices in opposing legs of the receiver portion, the pair of receiver pull down devices having gate terminals capacitively coupled to the differential signal transmission lines, and a second adjustable current source configured to provide current through a conducting one of the opposing legs of the driver portion;
wherein the transmission lines carry both transmitted signal information and DC power for the receiver portion, and wherein the voltage of the common mode voltage node is adjustably controlled by the pull up device of the differential driver portion.

2. The transmission circuit of claim 1, wherein the amount of power consumed by the driver portion in transmitting the bit stream is adjustably controlled such that a portion of the adjustable power is delivered to the receiver.

3. The transmission circuit of claim 1, wherein a differential voltage swing of the transmitted signal information is adjustably controlled by the driver portion.

4. The transmission circuit of claim 1, wherein the voltage of the common mode voltage node is also adjustably controlled by the first adjustable current source of the differential driver portion.

5. The transmission circuit of claim 1, wherein a differential voltage swing of the transmitted signal information is adjustably controlled by the first adjustable current source of the differential driver portion.

6. The transmission circuit of claim 1, wherein the pair of driver pair of pull down devices have a greater strength that the pair of receiver pull down devices.

7. The transmission circuit of claim 1, wherein the first adjustable current source of the differential driver portion provides a larger amount of current than the second adjustable current source of the receiver portion.

8. A bi-directional, chip-to-chip digital transmission circuit, comprising;
a first differential driver portion of a first chip domain;
a pair of differential signal transmission lines connected to the first differential driver portion, the differential signal transmission lines coupling the first chip domain to a second chip domain;
a first receiver portion of the second chip domain, connected to the transmission lines;
a second differential driver portion of the second chip domain, connected to the transmission lines, each of the first and second driver portions further comprising a pull up device configured between a voltage supply rail and a pair of driver side load resistors, said driver side load resistors connected to opposing legs of the differential driver portion, a pair of driver pull down devices connected to the opposing legs of the differential driver portion, wherein gate terminals of the pair of driver pull down devices comprise the driver side input node, and a driver side adjustable current source configured to provide current through a conducting one of the opposing legs of the driver portion; and
a second receiver portion of the first chip domain, connected to the transmission lines, each of the first and second receiver portions further comprising a pair of impedance matching load resistors connected at first ends thereof to a corresponding one of the differential signal transmission lines, said pair of impedance matching load resistors connected to one another at second ends thereof so as to define a common mode voltage node, a pair of common mode voltage load resistors coupled at first ends thereof to the common mode voltage node, and at second ends thereof, to a pair of receiver pull down devices in opposing legs of the receiver portion, the pair of receiver pull down devices having gate terminals capacitively coupled to the differential signal transmission lines, and a receiver side adjustable current source configured to provide current through a conducting one of the opposing legs of the driver portion;
wherein the transmission lines are configured to carry, in both directions, transmitted signal information from one of the chip domains and DC power for the receiver portion of the other of the chip domains, and wherein the voltage of the common mode voltage node is adjustably controlled by the pull up device of the differential driver portion.

9. The bi-directional transmission circuit of claim 8, wherein the amount of power consumed by the first and second driver portions in transmitting a digital bit stream is adjustably controlled.

10. The bi-directional transmission circuit of claim 8, wherein a differential voltage swing of transmitted signal information is adjustably controlled by the first and second driver portions.

11. The bi-directional transmission circuit of claim 8, wherein the voltage of the common mode voltage node is also adjustably controlled by the adjustable current source of the differential driver portion.

12. The bi-directional transmission circuit of claim 8, wherein a differential voltage swing of the transmitted signal information is adjustably controlled by the adjustable current source of the differential driver portion.

13. The bi-directional transmission circuit of claim 8, wherein the pair of driver pair of pull down devices have a greater strength that the pair of receiver pull down devices.

14. The bi-directional transmission circuit of claim 8, wherein the adjustable current source of the differential driver portion provides a larger amount of current than the adjustable current source of the receiver portion.

* * * * *